Figure 1:
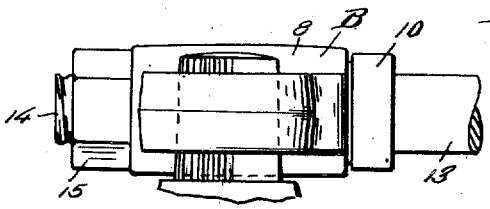

May 3, 1932. A. W. WEIMER ET AL Re. 18,451

BATTERY TERMINAL

Original Filed Jan. 3, 1927

Inventors

A. W. Weimer

Jacob T. Smith

By Clarence A. O'Brien

Attorney

Reissued May 3, 1932

Re. 18,451

UNITED STATES PATENT OFFICE

ALBERT W. WEIMER AND JACOB F. SMITH, OF GENESEO, ILLINOIS, ASSIGNORS TO WALTER PARSON, OF GENESEO, ILLINOIS

BATTERY TERMINAL

Original No. 1,665,048, dated April 3, 1928, Serial No. 158,718, filed January 3, 1927. Application for reissue filed April 2, 1930. Serial No. 441,158.

The present invention relates to a battery terminal and has for its prime object to provide a structure wherein the terminal is locked into secure engagement with the battery post against accidental displacement, rotation or other undesirable loose connection.

Another very important object of the invention lies in the provision of a device of this nature which is inexpensive to manufacture because of its simple structure yet is thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
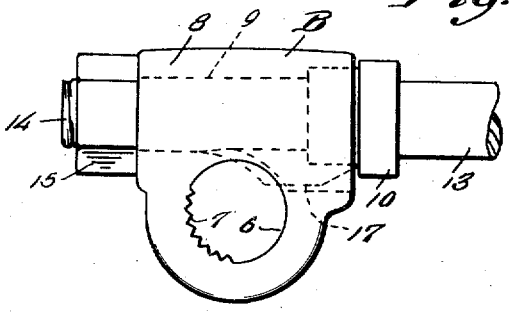
Figure 5:
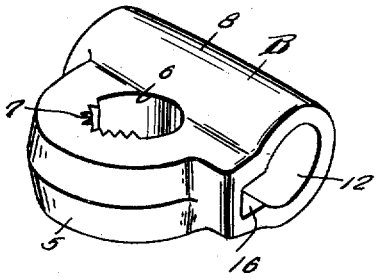
Figure 3:
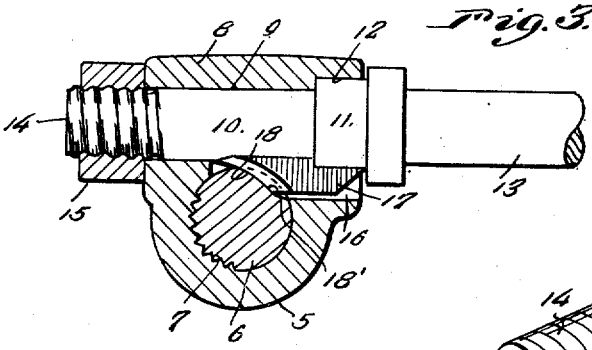
Figure 6:
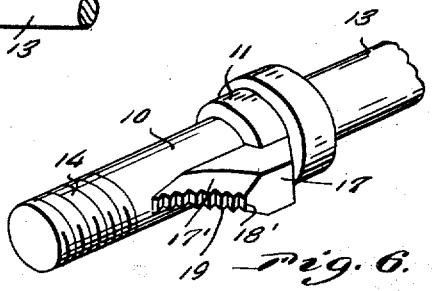
Figure 4:
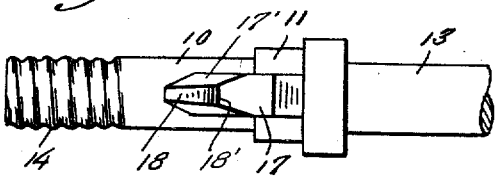

In the drawings:

Figure 1 is a side elevation of the terminal embodying the features of our invention, Figure 2 is a top plan view thereof, Figure 3 is a horizontal section therethrough, Figure 4 is a detail elevation of the shank case thereof, Figure 5 is a perspective of the center portion thereof, Figure 6 is a perspective view showing a modified form of the shank.

Referring to the drawings in detail it will be seen that the body of the terminal is indicated generally by the letter B and includes portion 5 having a bore 6 for receiving the battery post, a portion of the interior surface of the bore being corrugated or provided with teeth 7. Another portion of the terminal is denoted by numeral 8 and is provided with a longitudinally extending bore 9 the axis of which is at right angles to the axis of the bore 6. A shank 10 is adapted to be received within the bore 9 and has an enlarged end 11 adapted to be received in the countersunk end 12 of the bore 9.

The wire 13 is adapted to be fixed to this end of the shank in the usual well-known manner. The other end of the shank is threaded as indicated at 14 for receiving a nut 15. A recess 16 of elongated construction extends laterally from the bore 9 and at its inner end communicates with the bore 6. A tooth or locking element 17 extends laterally from the shank 10 adjacent the enlarged portion 11 and is adapted to function as a key in respect to the recess 6 so as to prevent the turning of the shank.

The inner end of this locking element 17 is arcuately formed for positioning eccentric to the axis of the bore 6 upon insertion of the locking element in the recess 16. The side edges of this arcuate portion are beveled as at 17′ to provide a relatively blunt cutting edge 18. The side perimeters of the arcuate cutting edge 18 terminates in a relatively sharp transverse edge 18′ which extends in a plane parallel to the axis of the bore 6 so as to bite sharply into the wall of the battery post P when inserted in the bore as will be readily appreciated from an inspection of Figure 3 of the drawings. If desired, the blunt arcuate edge 18 may be formed with transverse teeth 19 as more clearly shown in Figure 6.

Thus when the teeth 19 bite into the battery post the terminal is prevented from all rotation thereon because of the cooperating biting engagement of the cutting edge and the teeth 7 with the walls of the post. The shank 10, of course, is drawn into the bore 9 by the nut 15 causing the tooth to bite into the battery post. A very rigid and strong connection is thus made between the post and the terminal.

It is thought that the construction, utility, and advantages of this invention will now be apparent to those skilled in this art without a more detailed description thereof. It will be seen that the device is strong and durable, inexpensive to manufacture, and thoroughly reliable and efficient in use, either to assemble in respect to the post and very unlikely to become loosened in any manner.

The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit and scope of the invention as hereinafter claimed or sacrificing any of its advantages.

Having thus described our invention, what we claim as new is:

1. A battery terminal of the class described including a body having a pair of bores disposed at right angles to each other, and communicating at one side, one of said bores having a battery post inserted therein, an elongated member movable longitudinally in the other bore and a lateral projection on said member having an arcuate concaved biting edge eccentric to the axis of the post for penetrating the wall of the post upon predetermined movement of the member.

2. A battery terminal of the class described including a body having a pair of bores disposed at right angles to each other and communicating at one side, one of said bores being arranged for receiving a battery post, an elongated member movable longitudinally in the other of said bores, and a lateral projection on the member having an arcuate edge eccentric to the axis of the post, said arcuate edge having beveled sides to facilitate biting into the wall of the post upon predetermined movement of the member.

3. A battery terminal of the class described including a body having a pair of bores disposed at right angles to each other and communicating at one side, one of said bores being arranged for receiving a battery post, an elongated member movable longitudinally in the other of said bores, and a lateral projection on the member having an arcuate edge eccentric to the axis of the post, said arcuate edge having beveled sides to facilitate biting into the wall of the post upon predetermined movement of the member, and a biting edge formed at the outer end of the arcuate edge and disposed at a plane parallel with the axis of the post.

4. A battery terminal of the class described including a body having a pair of bores disposed at right angles to each other and communicating at one side, a recess in one of the bores communicating with the other bore, an elongated member movable longitudinally in the recessed bore having a locking element movable in the recess for engaging a battery post positioned in the other bore, said locking element having teeth formed in an arc eccentric to the axis of the post for successive engagement with the wall of the post upon a predetermined movement of the member.

5. A battery terminal of the class described including a body having a pair of bores disposed at right angles to each other and communicating at one side, a recess in one of the bores communicating with the other bore, an elongated member movable longitudinally in the recessed bore having a locking element movable in the recess for engaging a battery post positioned in the other bore, said locking element having teeth formed in an arc eccentric to the axis of the post for successive engagement with the wall of the post upon a predetermined movement of the member, and teeth formed on the wall of said bore for also engaging the side of the post to prevent relative rotary movement of the body.

JACOB F. SMITH.
ALBERT W. WEIMER.